United States Patent
Haas et al.

(10) Patent No.: US 9,595,017 B2
(45) Date of Patent: Mar. 14, 2017

(54) ASSET TRACKING AND MONITORING ALONG A TRANSPORT ROUTE

(71) Applicant: International Business Machines Corporation, Armonk, NY (US)

(72) Inventors: Norman Haas, Mount Kisco, NY (US); Arun Hampapur, Norwalk, CT (US); Ying Li, Mohegan Lake, NY (US); Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 13/626,050

(22) Filed: Sep. 25, 2012

(65) Prior Publication Data
US 2014/0085479 A1 Mar. 27, 2014

(51) Int. Cl.
*H04N 7/18* (2006.01)
*G06Q 10/08* (2012.01)

(52) U.S. Cl.
CPC .................... *G06Q 10/08* (2013.01)

(58) Field of Classification Search
CPC ................ H04N 7/18; G06Q 10/08
USPC ........................................... 348/159
See application file for complete search history.

(56) References Cited

U.S. PATENT DOCUMENTS

| | | | | |
|---|---|---|---|---|
| 6,229,988 B1 * | 5/2001 | Stapefeld | ............ | H04B 1/1615 340/7.35 |
| 6,237,051 B1 * | 5/2001 | Collins | ............ | G06F 17/30241 702/84 |
| 6,415,227 B1 * | 7/2002 | Lin | ........................ | G01C 21/20 340/988 |

(Continued)

FOREIGN PATENT DOCUMENTS

| CA | 2796110 A1 | 8/2011 |
|---|---|---|
| CN | 101971224 A | 2/2011 |

(Continued)

OTHER PUBLICATIONS

Darim Vision Co.; "VideoSpider Location Service for PVE400 with GPS"; Google; Aug. 2008.

(Continued)

*Primary Examiner* — Jay Patel
*Assistant Examiner* — Irfan Habib
(74) *Attorney, Agent, or Firm* — Ido Tuchman; Jeff LaBaw

(57) ABSTRACT

A system and computer program product for tracking and monitoring assets along a transport route. The system includes at least one receiver for receiving asset identifications transmitted from the assets, where each asset transmits its own asset identification. The receiver also receives physical location coordinates of each of the assets. A plurality of cameras is dispersed along the transport route for transmitting camera images of the assets. The system further includes a server coupled to the receiver and cameras. The (Continued)

server is configured to recognize the assets in the camera images, to correlate the asset identification from the receiver with recognized assets in the camera images, and to correlate the physical location coordinates of each of the assets with physical location coordinates of the cameras. The system monitors the visual appearance of the assets, and keeps track of whether or not they have sustained physical damage.

15 Claims, 7 Drawing Sheets

(56) References Cited

U.S. PATENT DOCUMENTS

| | | | | |
|---|---|---|---|---|
| 6,424,264 B1* | 7/2002 | Giraldin | G06K 17/00 | 340/539.1 |
| 6,774,811 B2* | 8/2004 | Kaufman | G06Q 20/203 | 340/10.41 |
| 6,791,603 B2* | 9/2004 | Lazo | G07C 9/00111 | 348/144 |
| 7,050,908 B1* | 5/2006 | Schwartz | G06T 7/2033 | 382/104 |
| 7,103,614 B1* | 9/2006 | Kucik | G08G 1/017 | 340/933 |
| 7,295,119 B2* | 11/2007 | Rappaport | G06F 17/509 | 340/5.8 |
| 7,394,372 B2* | 7/2008 | Gloekler | G01S 13/751 | 235/385 |
| 7,433,496 B2* | 10/2008 | Ishii | G06T 5/009 | 348/115 |
| 7,450,024 B2* | 11/2008 | Wildman | A61B 5/1113 | 340/573.1 |
| 7,605,696 B2* | 10/2009 | Quatro | G06Q 10/08 | 340/539.13 |
| 7,671,718 B2* | 3/2010 | Turner | G07C 9/00087 | 340/10.1 |
| 7,688,999 B2* | 3/2010 | Kim | G06K 9/00362 | 382/103 |
| 7,925,440 B2* | 4/2011 | Allen | G07B 15/063 | 340/933 |
| 8,013,735 B2* | 9/2011 | Arpin | G08G 1/205 | 340/426.19 |
| 8,126,210 B2* | 2/2012 | Fardi | G06T 7/004 | 348/148 |
| 8,184,863 B2* | 5/2012 | Wang | G06T 7/20 | 340/933 |
| 8,219,466 B2* | 7/2012 | Gui | G06Q 10/08 | 705/28 |
| 8,260,001 B2* | 9/2012 | Jung | G01S 7/4802 | 340/932.2 |
| 8,290,211 B2* | 10/2012 | Takahashi | G08G 1/017 | 382/104 |
| 8,301,363 B2* | 10/2012 | Grassi | G06K 9/723 | 382/198 |
| 8,310,377 B2* | 11/2012 | Sirota | G08G 1/017 | 340/905 |
| 8,331,621 B1* | 12/2012 | Allen | G08G 1/015 | 235/384 |
| 8,497,783 B2* | 7/2013 | Leopold | G01P 3/38 | 340/556 |
| 8,565,481 B1* | 10/2013 | Smith | G06K 9/00214 | 348/169 |
| 8,599,368 B1* | 12/2013 | Cilia | G01P 3/36 | 356/28 |
| 8,630,768 B2* | 1/2014 | McClellan | G01S 5/0027 | 340/439 |
| 8,712,873 B2* | 4/2014 | Sharma | G06Q 10/08 | 340/5.6 |
| 8,768,009 B1* | 7/2014 | Smith | G06T 7/004 | 340/937 |
| 8,830,299 B2* | 9/2014 | Osipov | G08G 1/054 | 348/36 |
| 8,867,819 B2* | 10/2014 | Calio | G06Q 10/087 | 382/153 |
| 8,890,717 B2* | 11/2014 | McClellan | G01S 5/0027 | 340/438 |
| 8,896,448 B2* | 11/2014 | Archer | G06Q 10/08 | 235/375 |
| 9,253,251 B2* | 2/2016 | Jackson | G08G 1/0175 | |
| 9,349,287 B1* | 5/2016 | Holzwanger | G08G 1/0133 | |
| 9,420,562 B1* | 8/2016 | Cai | H04W 64/003 | |
| 9,454,744 B2* | 9/2016 | Imming | G06Q 10/08 | |
| 2002/0111881 A1* | 8/2002 | Walker | G06Q 20/20 | 707/737 |
| 2004/0193707 A1* | 9/2004 | Alam | H04L 67/18 | 709/223 |
| 2005/0004723 A1* | 1/2005 | Duggan | G05D 1/0061 | 701/24 |
| 2007/0161382 A1* | 7/2007 | Melinger | H04L 67/18 | 455/456.1 |
| 2008/0108370 A1* | 5/2008 | Aninye | B60R 25/1004 | 455/456.1 |
| 2008/0172173 A1* | 7/2008 | Chang | G01C 21/30 | 701/408 |
| 2009/0005987 A1* | 1/2009 | Vengroff | G06Q 30/02 | 701/300 |
| 2009/0207050 A1* | 8/2009 | Arpin | G08G 1/205 | 340/988 |
| 2009/0216775 A1* | 8/2009 | Ratliff | G06Q 10/08 | |
| 2009/0327102 A1* | 12/2009 | Maniar | G06F 19/327 | 705/28 |
| 2013/0006769 A1* | 1/2013 | Schalk | G06Q 30/0266 | 705/14.54 |
| 2013/0038681 A1* | 2/2013 | Osipov | G08G 1/054 | 348/36 |
| 2014/0015832 A1* | 1/2014 | Kozko | G06T 13/60 | 345/420 |
| 2015/0134453 A1* | 5/2015 | Jhunjhnuwala | G06Q 30/0261 | 705/14.58 |
| 2016/0034750 A1* | 2/2016 | Bishop | G06K 9/00288 | 382/118 |

FOREIGN PATENT DOCUMENTS

| | | |
|---|---|---|
| JP | 2001034615 A | 2/2001 |
| RU | 2268175 C1 | 1/2006 |

OTHER PUBLICATIONS

Brown, AK.; "Precise Position and Attitude Georegistration of Video Imagery for Target Geolocation"; Google; 2008-2009.

Zelek-et al.; "Computer Vision Geo-Location, Awareness & Detail"; Google; 2010.

Electronic Data Solutions; "RICOH GPS Camera+ GIS Imaging Software"; 2009.

IBM, "Method and System for Providing Location Specific Tagging to Photographs", IPCOM000190467D (Dec. 1, 2009).

* cited by examiner

ASSET TRACKING AND MONITORING ALONG A TRANSPORT ROUTE

BACKGROUND

This invention relates to tracking and monitoring of assets along a transport route.

The locations of mobile objects such as cars and trucks, boxes containing merchandise, or even persons, can be kept track of by installing a GPS receiver and radio transmitter on the objects, such that they continuously or frequently transmit their identity and geospatial coordinates back to a centralized monitoring system (active mode), or transmit them when polled by a radio signal from the system (passive mode). However, conventional systems for tracking objects are generally not sufficient to be error-proof against spoofing or impostor objects. Phony transmissions can be sent and look-alike dummies can be presented. Thus, conventional asset-location reports typically cannot be trusted, database updates are questionable, and ultimately the information in the database about the assets cannot be trusted.

BRIEF SUMMARY

Accordingly, one example embodiment of the present invention is a system for tracking and monitoring assets along a transport route. The system includes at least one receiver for receiving asset identifications transmitted from the assets, where each asset transmits its own asset identification. The receiver also receives physical location coordinates of each of the assets. A plurality of cameras is dispersed along the transport route for transmitting camera images of the assets. The system further includes a server coupled to the receiver and cameras. The server is configured to recognize the assets in the camera images, to correlate the asset identification from the receiver with recognized assets in the camera images, and to correlate the physical location coordinates of each of the assets with physical location coordinates of the cameras.

Another example embodiment of the present invention is a computer program product for tracking and monitoring assets along a transport route. The computer program product includes computer readable program code configured to: receive asset identifications from the assets and physical location coordinates of each of the assets, where each asset transmits its own asset identification; transmit camera images of the assets by a plurality of cameras dispersed along the transport route; recognize the assets in the camera images; and correlate the asset identification with recognized assets in the camera images and the physical location coordinates of each of the assets with physical location coordinates of the cameras along the transport route.

BRIEF DESCRIPTION OF THE DRAWINGS

Embodiments of the invention will now be described, by way of example only, with reference to the following drawings.

DETAILED DESCRIPTION

Figure 1:
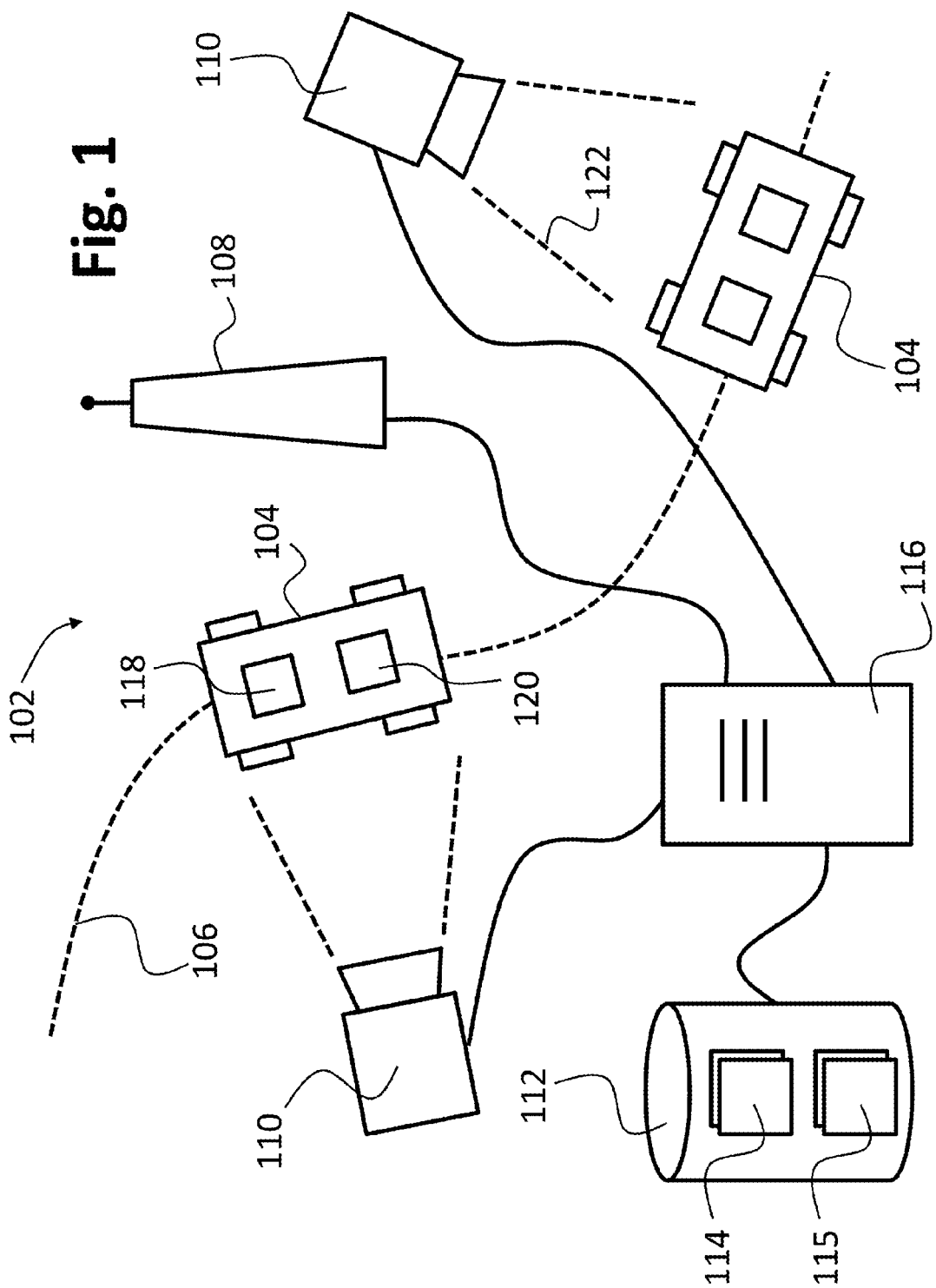
FIG. 1 shows a system for tracking and monitoring assets along a transport route in accordance with one embodiment of the present invention.

The present invention is described with reference to embodiments of the invention. Throughout the description of the invention reference is made to FIGS. 1-7. When referring to the figures, like structures and elements shown throughout are indicated with like reference numerals.

FIG. 1 shows an example system 102 for tracking and monitoring assets 104 along a transport route 106 in accordance with one embodiment of the present invention. The system includes at least one receiver 108 for receiving radio transmissions from the assets 104. Each transmission from an asset 104 includes its unique asset identification of that asset. The system further includes a plurality of cameras 110 dispersed along the transport route for transmitting camera images of the assets 104. The cameras 110 may be positioned at different locations along the assets' transport route 106. The system also includes a database 112 that contains a plurality of database images 114 for recognition of each of the assets 104.

A server 116 is coupled to the receiver 108, cameras 110 and database 112. The server 116 may communicate with the receiver 108, cameras 110 and database 112 through a computer network, such as a Local Area Network (LAN) or a Wide Area Network (WAN). The server 116 is configured to recognize the assets in the camera images using the database images 114 and to correlate the asset identification from the receiver 108 with recognized assets in the camera images. In one embodiment, the database images may include images 115 for determining if the assets 104 are damaged. Furthermore, the server 116 may be configured to send an alert if at least one of the assets 104 is determined to be damaged.

The system 102 may further include a transmitter 118 carried by each of the assets. The transmitter 118 is configured to transmit the unique asset identification of its respective asset 104. The transmitter 118 may also be configured to transmit the physical location coordinates of its respective asset 104. In a particular embodiment, each asset 104 includes a Global Positioning System (GPS) receiver 120 to determine the asset's physical location coordinates. In another embodiment, the transmitter 118 is a radio-frequency identification (RFID) transmitter. In this configuration, the receiver 108 is a RFID receiver proximate one of the cameras 110. In another embodiment, the physical location coordinates of each asset is determined by triangulation of the asset identification message or other messages transmitted from the asset.

The server 116 may be configured to correlate physical location coordinates from each of the assets 104 with physical location coordinates of the cameras 110 along the transport route. The server may further be configured to send an alert if at least one of the assets 104 is not recognized while the asset is determined to be within a field of view 122 of a respective camera 110. The server may also send an alert if at least one of the assets 104 is recognized while the asset is determined to be outside a field of view 122 of a respective camera 110.

According to one embodiment of the invention, a system includes a database of some mobile objects of interest (also referred to herein as "assets"), along with their locations and their appearances. The assets have attached GPS transmitters that periodically report their position and identity.

Figure 2:
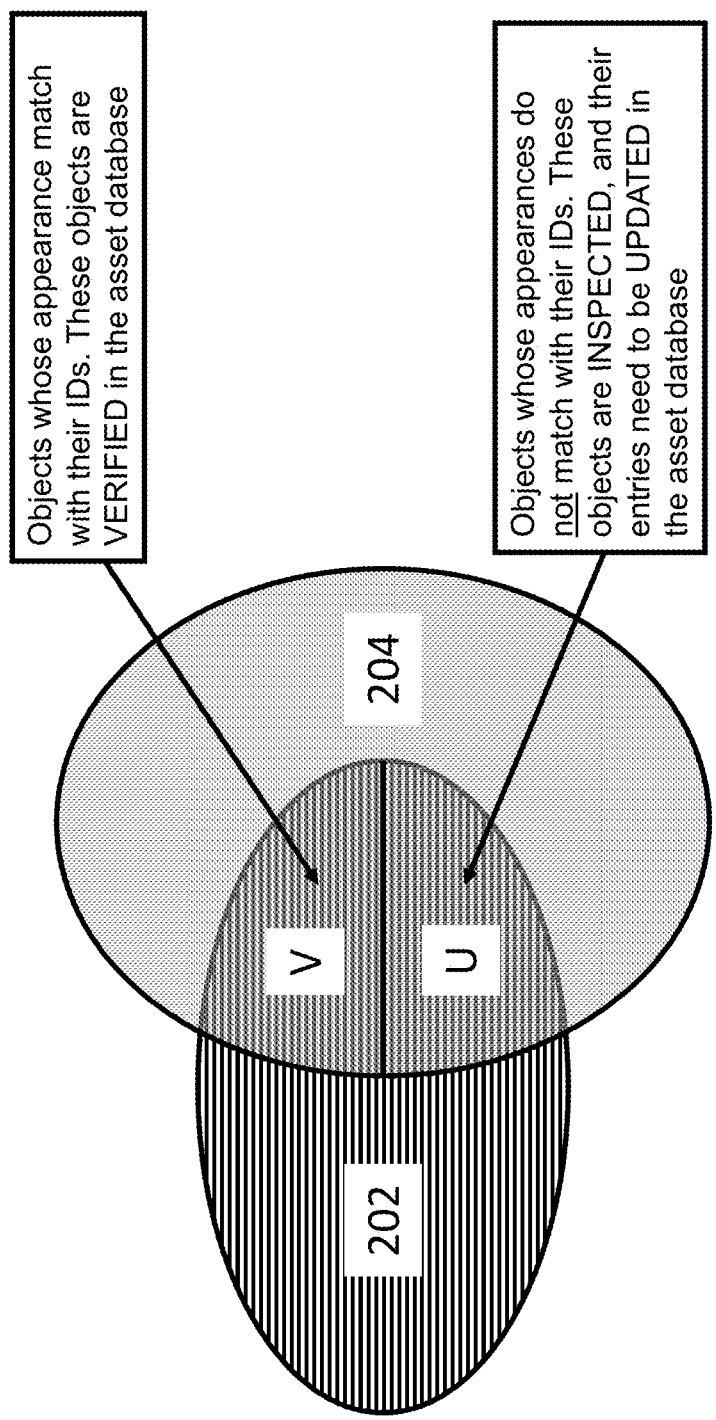
FIG. 2 illustrates of two asset tracking scenarios contemplated by an embodiment of the present invention.

Turning to FIG. 2, at a given moment, there can be two subsets of these objects; one being those whose GPS transmitters report that they are within an area covered by a specific GPS position reading (horizontally striped region 202), and the other being those objects within the field-of-view of a video camera at that GPS location (vertically striped region 204). The intersection of these two regions can be divided into two cases, indicated by V and U. Particularly, V indicates the case where the objects' appearances (in the images) match with their IDs (from GPS). These objects are thus verified in the object (asset) database. In contrast, U indicates the case where the objects' appearances (in the images) do not exactly match with their IDs (from GPS). In this case, these objects need to be inspected to ensure that nothing is wrong with the GPS device, or the GPS device has not been replaced. Note that camera malfunction such as dirt on the lens, could also cause such mismatching. In that case, the camera may need to be inspected. However, in this embodiment, we assume that all cameras work normally. Once the inspection is passed, the object entries in the object/asset database will be updated with their latest visual appearances. This process is repeated over time. By these means, the database of assets is maintained up-to-date.

Figure 3:
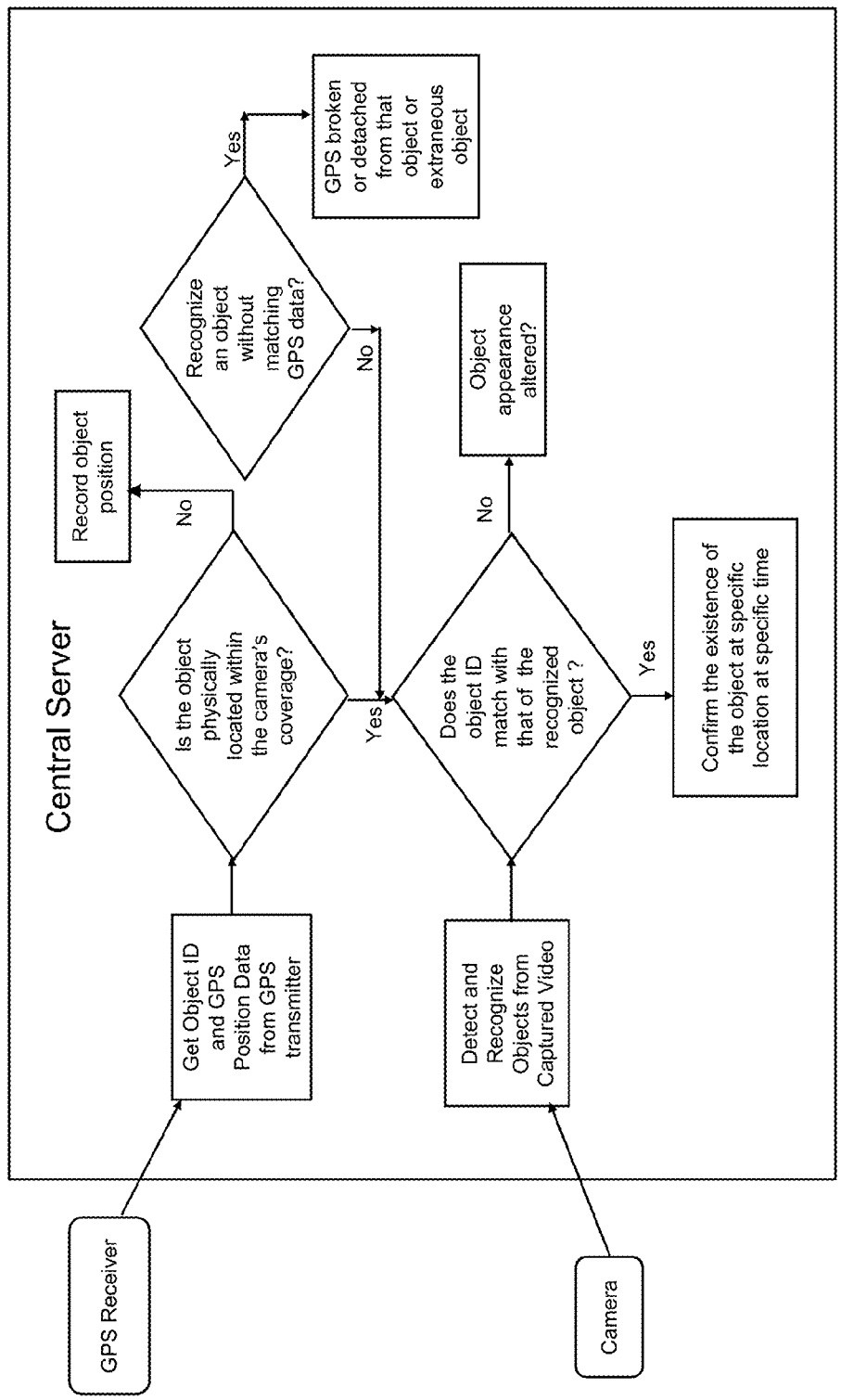
FIG. 3 shows a flowchart of an object location, verification and inspection system according to one embodiment of the present invention.

As shown in FIG. 3, assuming that every moving object has an onboard GPS device which can be used to uniquely identify the object (denote it as object O with an identity IDo), as well as reporting its physical location, then once it enters the area which is monitored by a stationary camera, the following process and analysis can be performed.

First, based on the GPS data of the moving object, as well as the prior knowledge about the area that a particular camera can cover, we can roughly estimate if the object has entered the camera's view or not. Second, once we determine that the object with IDo has entered that camera's view, we proceed to detect and recognize the objects from the captured video. Then for each object recognized, we compare its identity with IDo. If they are matched, then we confirm that this particular object O has appeared at this specific location at some specific time. Otherwise, if none of the objects recognized from the video whose ID matches with IDo, then it might be that the appearance of this object has been altered. A more intensive inspection would thus be needed for this object.

On the other hand, it is also likely that from the video stream, certain objects with specific IDs are detected and recognized, yet no such objects are reported by the GPS devices which are supposedly to be onboard. This could potentially mean that such objects have GPS devices that have been broken or detached from the objects.

Figure 4:
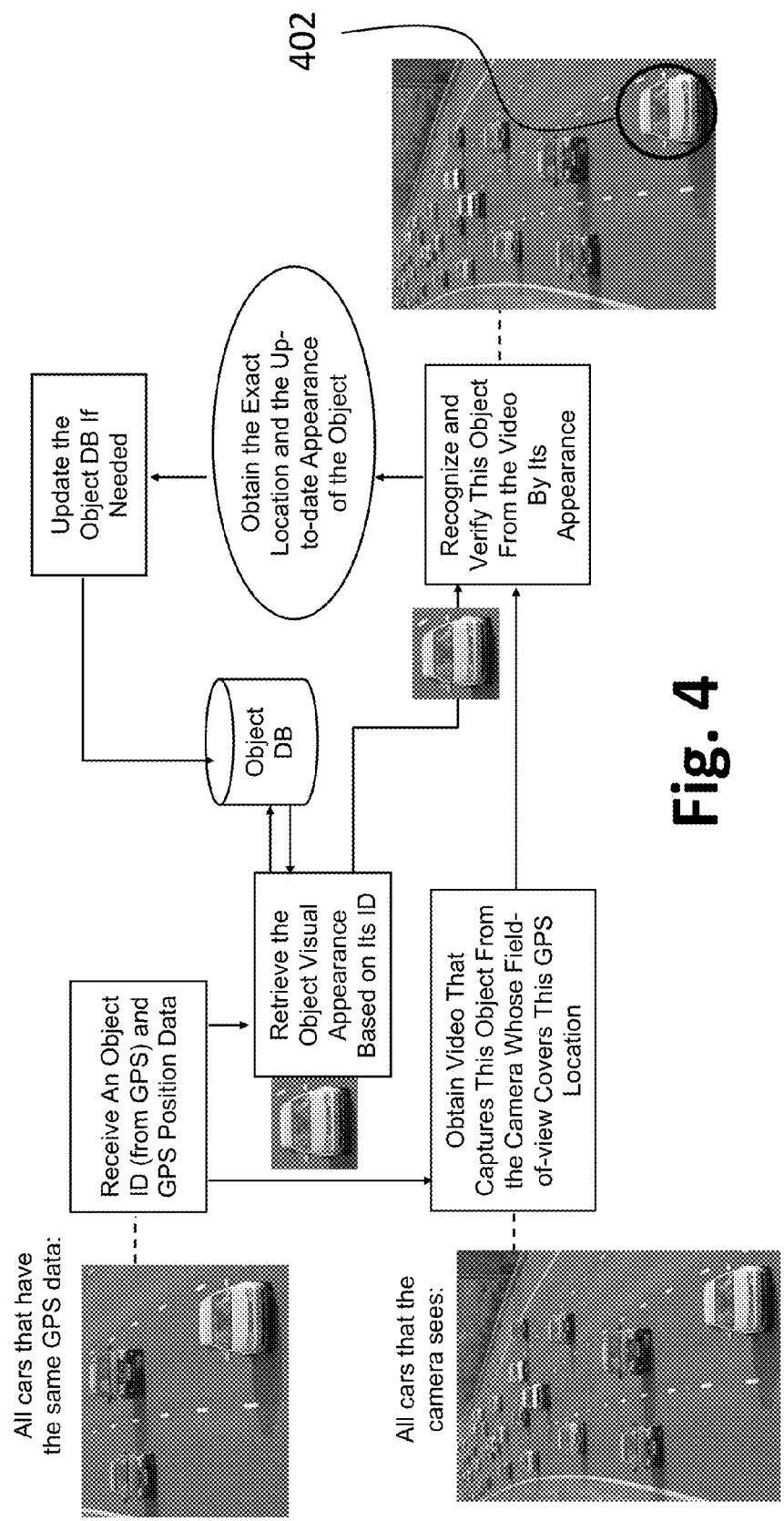
FIG. 4 shows a detailed example of verifying a specific object according to one embodiment of the present invention.

FIG. 4 shows a detailed example of verifying a specific object according to one embodiment of the invention. As shown, once we receive an object ID from the GPS device, we first retrieve the object's visual appearance based on such ID from the object database. Meanwhile, we obtain the video frame(s) that capture this object based on the object's GPS positioning information. Next, we try to recognize and verify this object from the video based solely on the object's appearance. If the object is indeed recognized, we obtain the exact location as well as the up-to-date appearance of this object, and update such information in the object database.

Figure 5:
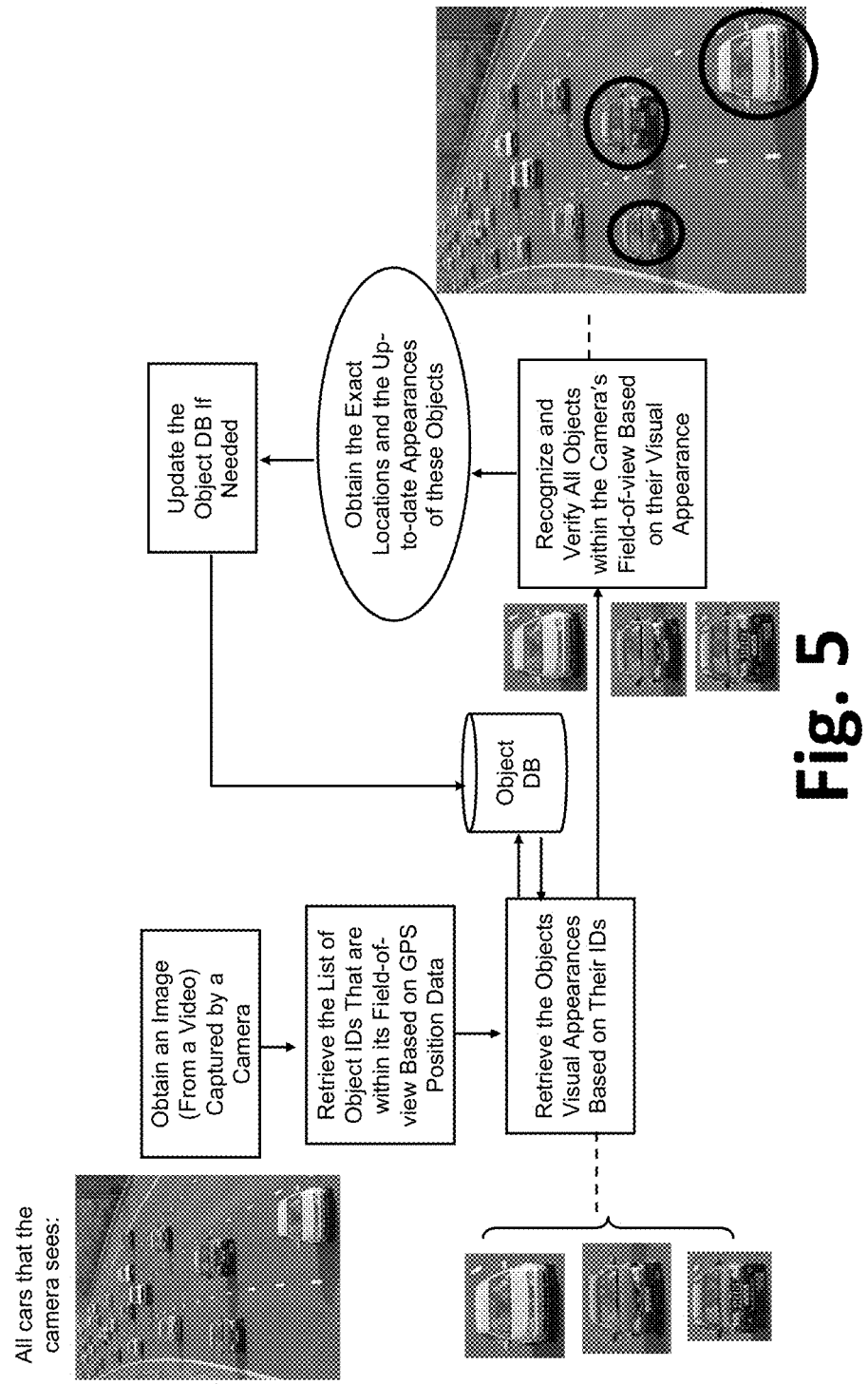
FIG. 5 illustrates an example of verifying multiple objects according to one embodiment of the present invention.

Following similar logic, we can verify multiple objects at the same time as shown in FIG. 5, as a more practical and efficient solution. More specifically, given a video frame, we first retrieve a list of IDs of objects (from GPS devices) that are within the camera's field-of-view based on GPS positioning data. Then the visual appearances of these objects are retrieved from the object database. Next, these objects are recognized and verified, based on their appearances in the video frame. Finally, the object database is updated (if necessary) with the latest object appearance information and their current locations.

Figure 6:
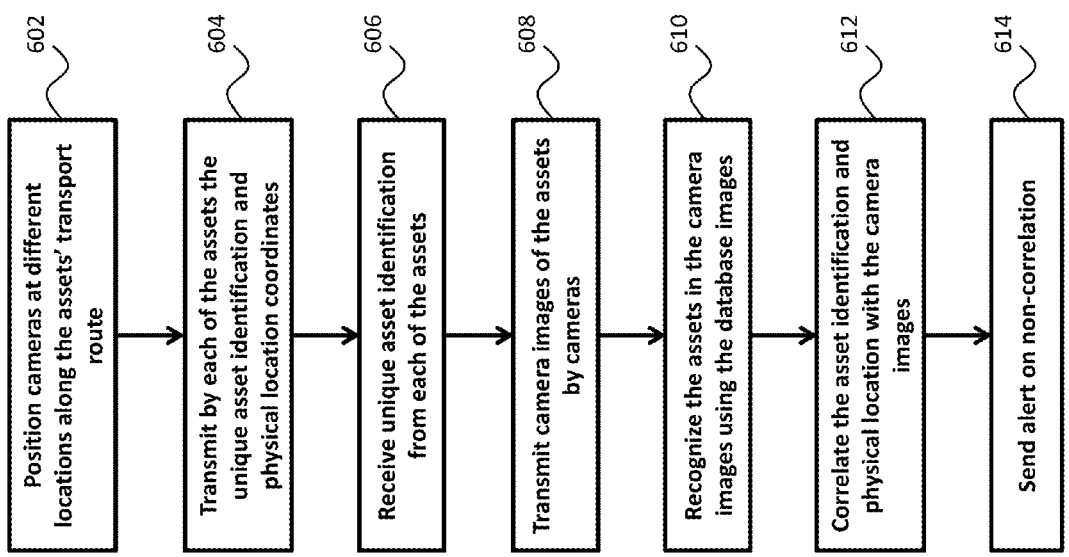
FIG. 6 shows a flowchart depicting a method for tracking and monitoring assets along a transport route according to one embodiment of the present invention.

FIG. 6 shows a flowchart depicting a method for tracking and monitoring assets along a transport route according to one embodiment of the present invention. The method begins at positioning step 602. During this operation, cameras are positioned at different locations along the assets' transport route. The camera coverage is not required to be continuous along the transport route. In other words, the assets do not have to be in camera view at all times during transport. After positioning step 602 is completed, the method continues to transmitting step 604.

At transmitting step 604, each of the assets transmits its unique asset identification. In one embodiment of the invention, the asset also transmits its physical location coordinates. For example, a GPS receiver carried by each of the assets may be used to determine the asset's physical location coordinates. In an alternate embodiment, a RFID transmitter may be carried by each of the assets. In this arrangement, RFID receivers are positioned proximate to one of the cameras such that the location coordinates of the assets are based on the position of the cameras or RFID receivers. In another embodiment, the physical location coordinates of each of the assets is determined by triangulating messages, such as the asset identification, transmitted by the assets. After transmitting step 604 is completed, the process continues to receiving step 606.

At receiving step 606, the unique asset identification from each of the assets is received. As discussed above, the unique asset identification may be accompanied with the assets' physical location coordinates. After receiving step 606 is completed, the process continues to transmitting step 608.

At transmitting step 608, camera images of the assets by a plurality of cameras dispersed along the transport route are transmitted. The camera images may be still images or part of a streaming video feed. After transmitting step 608 is completed, the method continues to recognizing step 610.

At recognizing step 610, the assets in the camera images are recognized. In one embodiment, the assets are recognized using database images stored in a database of all assets that are being tracked and monitored. For example, a server having one or more computer processors may perform object recognition by matching partial or the whole camera images to the stored database images. After recognizing step 610 is completed, the method continues to correlating step 612.

At correlating step 612, the asset identification is correlated with recognized assets in the camera images. In one embodiment, the physical location coordinates from each of the assets is correlated with physical location coordinates of the cameras along the transport route.

As such, tracking and managing the assets uses two modalities, both of which are be generated, directly or indirectly, by the asset. For example, by obtaining, within a short time interval of each other a message transmitted from one of the assets itself, which contains a declaration of that asset's identification code, and from which message the location of that object can be determined, either from its content or by triangulating its point of transmission, and (2) a visual sighting of the object, as by a video camera in the vicinity of the deduced location whose viewing geometry is calibrated with respect to the location coordinates/frame of reference of (1), the verification of the asset information can be achieved.

Thus, by combining, for instance, GPS on the asset and cameras together, a complete system that keeps track, to high precision, over a wide area, of verified assets, and manages their integrity, can be created. In particular, two reports in close temporal proximity, one from an asset's GPS, reporting a location very near a camera's location, and one from that camera, reporting that it saw that object (or at least, an object whose appearance could not be distinguished from that object's previously known appearance), provide proof with very high certainty that that object was at that position at that time.

If the object's appearance varies from what was expected, an analysis can be performed to decide if it is the correct object, but damaged in some way, or a different, possibly spoofing, object. Additionally, visual sighting of an object without any corresponding GPS report, can be used as an inspection technique, to find objects that erroneously did not have GPS units attached to them, or whose GPS units have failed (i.e., dead battery or broken transmitter).

After correlating step 612 is completed, process flow passes to sending operation 614. In one embodiment, an alert is sent if at least one of the assets is not recognized while the asset is determined to be within a field of view of a respective camera. An alert may also be sent if at least one of the assets is recognized while the asset's physical location is determined to be outside a field of view of a respective camera from the plurality of cameras. An alert may also be sent if at least one of the assets is determined to be damaged based on database images.

Figure 7:
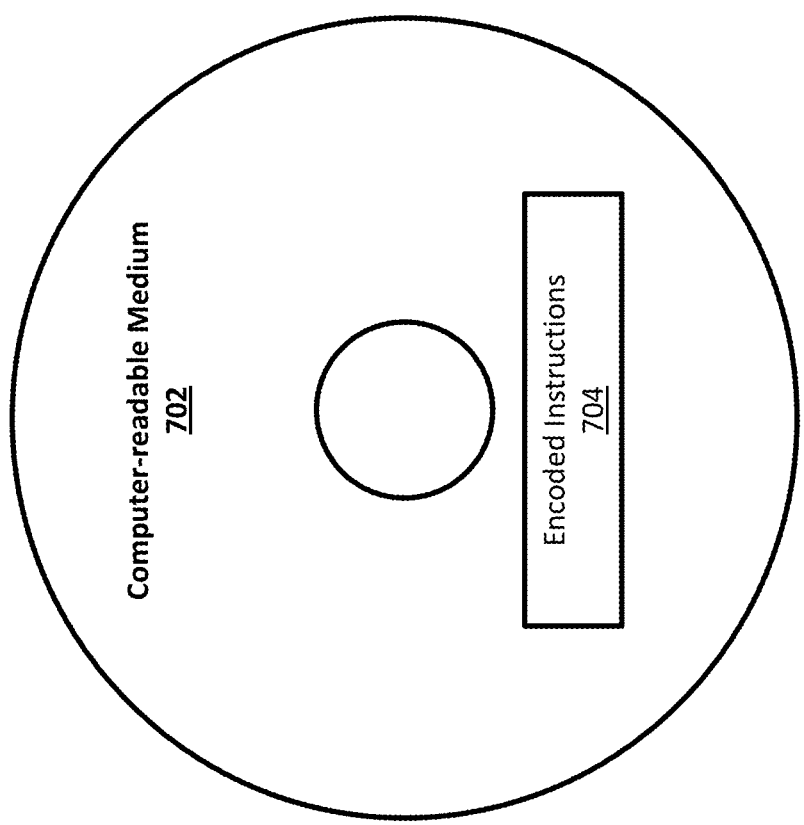
FIG. 7 shows a computer-readable medium encoding instructions for performing a method for tracking and monitoring assets along a transport route according to one embodiment of the present invention.

FIG. 7 shows a computer-readable medium 702, such as a CDROM, encoding instructions for performing a method for tracking and monitoring assets along a transport route 704 according to one embodiment of the present invention.

As will be appreciated by one skilled in the art, aspects of the present invention may be embodied as a system, method or computer program product. Accordingly, aspects of the present invention may take the form of an entirely hardware embodiment of the invention, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for tracking and monitoring assets along a transport route, the system comprising: at least one receiver for receiving asset identifications transmitted from the assets and physical location coordinates of each of the assets, where each asset transmits its own asset identification; a plurality of cameras dispersed along the transport route for transmitting camera images of the assets; a server coupled to the at least one receiver and cameras, the server configured to recognize the assets in the camera images, to correlate the asset identification from the receiver with recognized assets in the camera images, and to correlate the physical location coordinates of each of the assets with physical location coordinates of the cameras; and wherein the server is further configured to send an alert when at least one of the assets is not recognized while the asset is determined to be within a field of view of a respective camera from the plurality of cameras; wherein the physical location coordinates of each of the assets is determined by triangulation of messages transmitted from the assets; wherein the server is further configured to send an alert when at least one of the assets is recognized while the asset is determined to be outside a field of view of a respective camera from the plurality of cameras; wherein the plurality of database images include images for determining if the assets are damaged.

2. The system of claim 1, further comprising a transmitter carried by each of the assets, the transmitter configured to transmit the unique asset identification.

3. The system of claim 2, wherein the transmitter is further configured to transmit its physical location coordinates.

4. The system of claim 3, further comprising a Global Positioning System (GPS) receiver carried by each of the assets to determine the asset's physical location coordinates.

5. The system of claim 2, wherein the transmitter is a radio-frequency identification (RFID) transmitter.

6. The system of claim 5, wherein the at least one receiver is a radio-frequency identification (RFID) receiver proximate to one of the cameras.

7. The system of claim 1, wherein the cameras are positioned at different locations along the assets' transport route.

8. The system of claim 1, further comprising: wherein the server is further configured to send an alert if at least one of the assets is determined to be damaged.

9. The system of claim 1, further comprising:
a database including a plurality of database images for recognition of each of the assets; and
wherein the server is configured to recognize the assets in the camera images using the database images.

10. A computer program product for tracking and monitoring assets along a transport route, the computer program product comprising: a non-transitory computer readable storage medium having computer readable program code embodied therewith, the computer readable program code configured to: receive asset identifications from the assets and physical location coordinates of each of the assets, where each asset transmits its own asset identification; transmit camera images of the assets by a plurality of cameras dispersed along the transport route; recognize the assets in the camera images; and correlate the asset identification with recognized assets in the camera images and the physical location coordinates of each of the assets with physical location coordinates of the cameras along the transport route; and send an alert when at least one of the assets is recognized while the asset is determined to be outside a field of view of a respective camera from the plurality of cameras; wherein the physical location coordinates of each of the assets is determined by triangulation of messages transmitted from the assets; wherein computer readable program code configured to send an alert when at least one of the assets is not recognized while the asset is determined to be within a field of view of a respective camera from the plurality of cameras; wherein the plurality of database images include images for determining if the assets are damaged.

11. The computer program product of claim 10, further comprising computer readable program code configured to transmit by each of the assets the unique asset identification.

12. The computer program product of claim 11, further comprising computer readable program code configured to transmit by each of the assets physical location coordinates of the asset.

13. The computer program product of claim 10, further comprising computer readable program code configured to correlate physical location coordinates from each of the assets with physical location coordinates of the cameras along the transport route.

14. The computer program product of claim 10, further comprising: computer readable program code configured to send an alert if at least one of the assets is determined to be damaged.

15. The computer program product of claim 10, further comprising:
  computer readable program code configured to store database images of the assets in a database; and
  wherein the assets in the camera images are recognized using the database images.

\* \* \* \* \*